March 8, 1955 P. D. CROTHERS 2,703,719
REMOVABLE SEAT FOR PIPE JOINT PACKING
Filed June 14, 1952
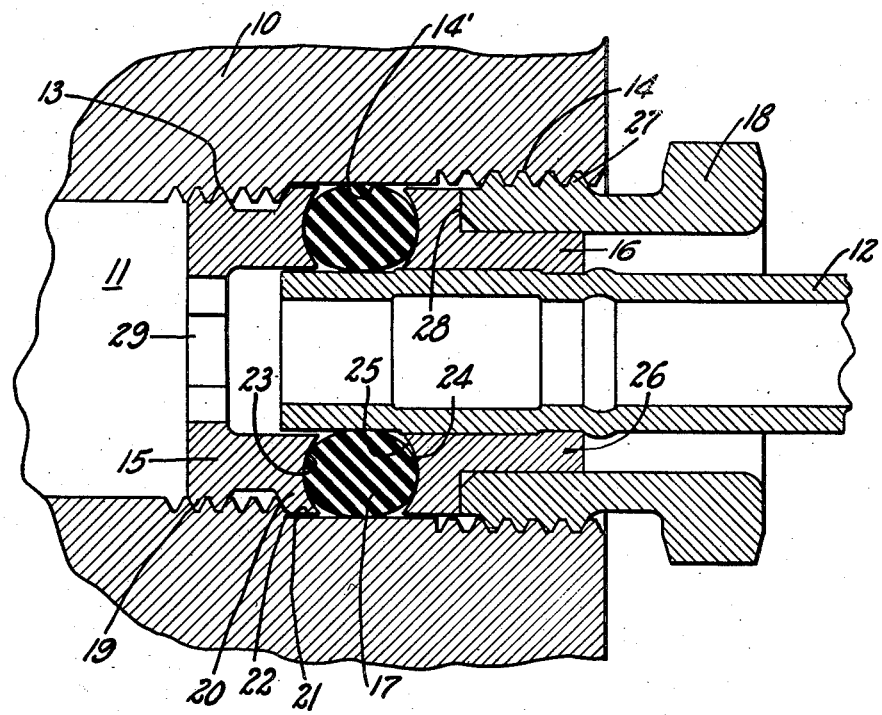
INVENTOR.
PAUL D. CROTHERS
BY
ATTORNEY

United States Patent Office

2,703,719
Patented Mar. 8, 1955

2,703,719

REMOVABLE SEAT FOR PIPE JOINT PACKING

Paul D. Crothers, South Bend, Ind., assignor to Bendix Aviation Corporation, South Bend, Ind., a corporation of Delaware Application June 14, 1952, Serial No. 293,576

5 Claims. (Cl. 285—46)

The primary object of the present invention is to provide a relatively simple and efficient seal and connector or coupling assembly for connecting one conduit or flow passage to another, as where a pipe or tube is to be connected to a pump outlet or to a direct fuel injection nozzle or the like.

Another and more specific object is to provide a seal and connector or coupling assembly of the type specified employing a flexible oval-shaped packing ring compressed between opposed contoured seat members, together with a packing nut, all coacting to provide a fluid-tight seal and wherein the nut may be tightened down without distorting the sealing surfaces and at the same time anchor the tube or pipe firmly in place against displacement due to vibration and high fluid pressures.

The foregoing and other objects and advantages will become apparent in view of the following description taken in conjunction with the drawings, wherein the single figure illustrates in substantially central longitudinal section a coupling and seal assembly in accordance with the invention.

Referring to the drawing, the numeral 10 indicates a wall defining a flow passage 11, which wall could be the body of a fuel injection nozzle, high pressure fluid pump, or like device. The tube or conduit to be connected into and form a continuation of the passage 11 is indicated at 12. That portion of the passage 11 which provides a socket for the seal and connector assembly is formed with internal threads 13 and 14 at spaced points therealong with a smooth annular seal ring contact surface 14' therebetween. The seal and connector assembly proper comprises a seat nut 15, a ferrule 16, a seal or packing ring 17 and a clamp or packing nut 18. The seat nut 15 is externally threaded at 19, the latter threads being adapted to engage the threads 13 in the wall or body 10. At its right-hand end the nut 15 is provided with an annular thrust head 20, the outer diameter 21 of which engages a shoulder 22 provided at the adjacent terminus of the threads or threaded portion 13. The head 20 is formed with a concave seat 23 to accommodate the adjacent surface of the ring 17, which is of oval-shape in cross section and preferably comprised of material capable of resisting heat and high pressure and which will not deteriorate through contact with the fluid flowing in passage 11. In the present instance, the fluid in passage 11 is fuel and the ring is comprised of a synthetic rubber composition.

The ferrule 16 is also provided with a thrust head 24, having a concave seat 25, which coacts with the seat 23 to provide oppositely-disposed concave recesses for engaging the opposite sides of the oval ring 17. The outer end of the ferrule 16 is provided with an annular radially-inward projecting boss 26, which engages the tube 12 in a manner such to be held against longitudinal and angular or rotational displacement with respect to the tube. In the present instance, the tube is expanded outwardly into engagement with the ferrule. However, the ferrule may be swaged into engagement with the adjacent surface of the tube or otherwise fixed with respect thereto, the object being to anchor the ferrule against longitudinal and rotational displacement with respect with the tube.

The nut 18 is externally threaded at 27 for engagement with the threads 14 formed in the socket 11, and the inner end of said nut engages a shoulder 28 defined by the enlarged head 24 of the ferrule 16.

In mounting the assembly, the seat member 15 is first threaded into the socket defined by a portion of the passage 11. This may be facilitated by using a suitable tool adapted to engage in a polygonal-sided opening 29 formed in the center of said seat member. The tube 12, ferrule 16, ring 17 and nut 18 are then inserted as an assembled unit and the nut tightened down to clamp the ring between the concave seats 23 and 25. Due to the oval-shaped contour of the ring 17, a highly effective seal is formed between the seats 23 and 25 and also at the points of contact of the ring with the tube 12 and the wall or housing 10.

Since the ferrule 16 is held against rotation on the tube 12, the nut 18 can be tightened down without causing relative movement between the seat 25 and the ring 17, so that the latter is not distorted and deformed when the unit is initially assembled or when the nut 18 is adjusted after assembly, while at the same time the tube is firmly held against displacement due to high pressures and vibration while in service.

While only one form of the improved seal and coupling unit has been shown and described, it will be obvious that certain minor changes in form and arrangement of parts may be made to suit different installations.

I claim:

1. Means for connecting and sealing a pipe or tube in flow-communication with a conduit or flow passage defining a socket having inner and outer threaded portions separated by a smooth annular wall portion, the outer threaded and smooth portions being at least as large in diameter as the thread root diameter of the inner portion into which the tube is inserted, comprising an externally-threaded seat nut adapted for threaded engagement with the innermost threaded portion of the socket and having a thrust portion provided with a seal ring seating surface of generally concave contour in cross-section extending substantially from said tube to the smooth annular wall portion of said socket, a ferrule encircling the tube outwardly of the seat nut and having a thrust portion providing a seating surface of generally concave cross-section oppositely disposed to that of the seat nut, a seal ring of substantially oval-shaped in cross section encircling the tube between and extending substantially across said seating surfaces, said oval shaped ring having a major diameter extending substantially parallel to the axis of said tube, an externally-threaded clamp nut threaded into the outer end of the socket including means for forcing the ferrule into clamping engagement with the seal ring, and means connecting the ferrule to the tube and preventing rotation therebetween.

2. Connecting and sealing means as claimed in claim 1 wherein the means for connecting the ferrule to the tube comprises a radially inwardly projection portion formed on the ferrule which engages the contiguous wall of the tube.

3. Means for connecting and sealing a pipe or tube in flow-communication with a conduit or flow passage defining a socket having inner and outer threaded portions separated by a smooth annular wall portion, the outer threaded and smooth portions being at least as large in diameter as the thread root diameter of the inner portion into which the tube is inserted, comprising an externally-threaded seat nut adapted for threaded engagement with the interior of the socket and having a thrust portion provided with a seal ring seating surface of generally concave contour in cross section and a shoulder axially spaced from said thrust portion adapted to abut a complementary shoulder formed in the wall of the socket, a ferrule encircling the tube outwardly of the seat nut and having a thrust portion provided with a seating surface of generally concave cross-section oppositely disposed to that of the seat nut, a seal ring of substantially oval-shaped in cross-section encircling the tube between said seating surfaces, said oval shaped ring having a major diameter extending substantially parallel to the axis of said tube, an externally-threaded clamp nut threaded into the outer end of the socket including means for forcing the ferrule into clamping engagement with the seal ring, and means connecting the ferrule to the tube in a manner such as to hold the ferrule against rotation with respect to the seal ring.

4. Means for connecting and sealing a pipe or tube in flow communication with a conduit or flow passage defining a socket having inner and outer threaded portions sep arated by a smooth annular wall portion, the outer threaded and smooth portions being at least as large in diameter as the thread root diameter of the inner portion into which the tube is inserted, comprising a seat member threadedly received in the socket and having a thrust head provided on one side with a shoulder adapted to butt against said inner portion and on the other side with a seal ring seating surface of generally concave contour in cross-section extending substantially from said tube to said socket, a ferrule encircling the tube in spaced relation to the seat nut and having a thrust head provided with a seating surface of generally concave cross-section oppositely disposed to that of the seat nut, a seal ring of substantially oval-shape in cross section encircling the tube between and extending substantially across said seating surfaces, said oval shaped ring having a major diameter extending substantially parallel to the axis of said tube, and an externally threaded clamp nut including means for forcing the ferrule into clamping engagement with the seal ring.

5. A coupling and sealing assembly for joining a pipe or tube end in flow-communication with a conduit or flow passage defining a socket having inner and outer threaded portions separated by a smooth annular wall portion, the outer threaded and smooth portions being at least as large in diameter as the thread root diameter of the inner portion into which the tube end is inserted, comprising an inner externally-threaded seat nut in threaded engagement with the wall of the socket and formed with a thrust head provided with a seal ring seating surface extending substantially from said tube to the smooth wall portion of said socket, a ferrule secured against rotation on the tube end and having a thrust head formed with a seating surface of generally concave cross-section oppositely disposed to that of the seat nut, a seal ring of flexible material encircling the tube between and extending substantially across said seating surfaces, and an externally-threaded packing nut including means for forcing the ferrule into clamping engagement with the seal ring.

References Cited in the file of this patent

UNITED STATES PATENTS

| | | |
|---|---|---|
| 519,568 | Cooney | May 8, 1894 |
| 648,232 | Brandt | Apr. 24, 1900 |
| 1,083,742 | Hutchinson | Jan. 6, 1914 |
| 1,111,283 | Alexander | Sept. 22, 1914 |
| 1,853,411 | Gentry et al. | Apr. 12, 1932 |
| 2,238,709 | Schraig | Apr. 15, 1941 |
| 2,452,277 | Woodling | Oct. 26, 1948 |
| 2,525,652 | Cunningham | Oct. 10, 1950 |